United States Patent
Heck

(10) Patent No.: US 8,404,993 B2
(45) Date of Patent: Mar. 26, 2013

(54) DEVICE FOR MACHINING WORKPIECES

(75) Inventor: Bruno Heck, Durmersheim (DE)

(73) Assignee: IHT Automation GmbH & Co. KG, Baden-Baden (DE)

( * ) Notice: Subject to any disclaimer, the term of this patent is extended or adjusted under 35 U.S.C. 154(b) by 1001 days.

(21) Appl. No.: 12/312,198

(22) PCT Filed: Oct. 17, 2007

(86) PCT No.: PCT/EP2007/061065
§ 371 (c)(1),
(2), (4) Date: Apr. 29, 2009

(87) PCT Pub. No.: WO2008/071487
PCT Pub. Date: Sep. 19, 2008

(65) Prior Publication Data
US 2010/0051593 A1    Mar. 4, 2010

(30) Foreign Application Priority Data

Dec. 15, 2006   (DE) .......................... 10 2006 059 784

(51) Int. Cl.
*B23K 10/00*    (2006.01)
(52) U.S. Cl. .......... 219/121.54; 219/121.48; 219/121.39
(58) Field of Classification Search ............. 219/121.39, 219/121.44, 121.45, 121.46, 121.48, 121.54, 219/121.57, 121.59
See application file for complete search history.

(56) References Cited

U.S. PATENT DOCUMENTS

| | | | |
|---|---|---|---|
| 5,334,834 A * | 8/1994 | Ito et al. | 250/288 |
| 5,371,336 A | 12/1994 | Albert et al. | |
| 6,300,592 B1 * | 10/2001 | Ulrich et al. | 219/121.67 |
| 6,329,757 B1 * | 12/2001 | Morrisroe et al. | 315/111.51 |
| 6,600,131 B2 * | 7/2003 | Virtanen et al. | 219/121.67 |
| 7,214,934 B2 * | 5/2007 | Stevenson | 250/286 |
| 2008/0040940 A1 | 2/2008 | Schmall et al. | |

FOREIGN PATENT DOCUMENTS

| | | |
|---|---|---|
| DE | 27 44 362 | 4/1979 |
| DE | 87 13 968 | 1/1988 |
| DE | 37 04 178 | 8/1988 |
| DE | 94 19 477 | 2/1995 |
| DE | 196 34 782 | 3/1998 |
| DE | 100 59 232 | 6/2002 |
| DE | 10 2004 042 135 | 3/2006 |
| FR | 2 690 244 | 10/1993 |
| WO | WO 2006/024338 | 3/2006 |

OTHER PUBLICATIONS

International Search Report.

* cited by examiner

*Primary Examiner* — Mark Paschall
(74) *Attorney, Agent, or Firm* — Collard & Roe, P.C.

(57) ABSTRACT

The invention relates to a device for machining, particularly for cutting, of electrically conductive workpieces using a machining tool (10), which can be displaced back and forth toward and away from a workpiece by means of a drive unit and which comprises an electrically insulated, metallic tool head (12) forming a first capacitance ($C_1$) with the workpiece, and comprising an analysis unit (14) for analyzing a characteristic value dependent on the first capacitance ($C_1$). The invention provides that a metallic connecting element (18) is attached to the tool head (12), the element being connected to the analysis unit (14) and forming a second capacitance ($C_2$) with the tool head (12).

11 Claims, 2 Drawing Sheets

DEVICE FOR MACHINING WORKPIECES

CROSS REFERENCE TO RELATED APPLICATIONS

Figure 1:
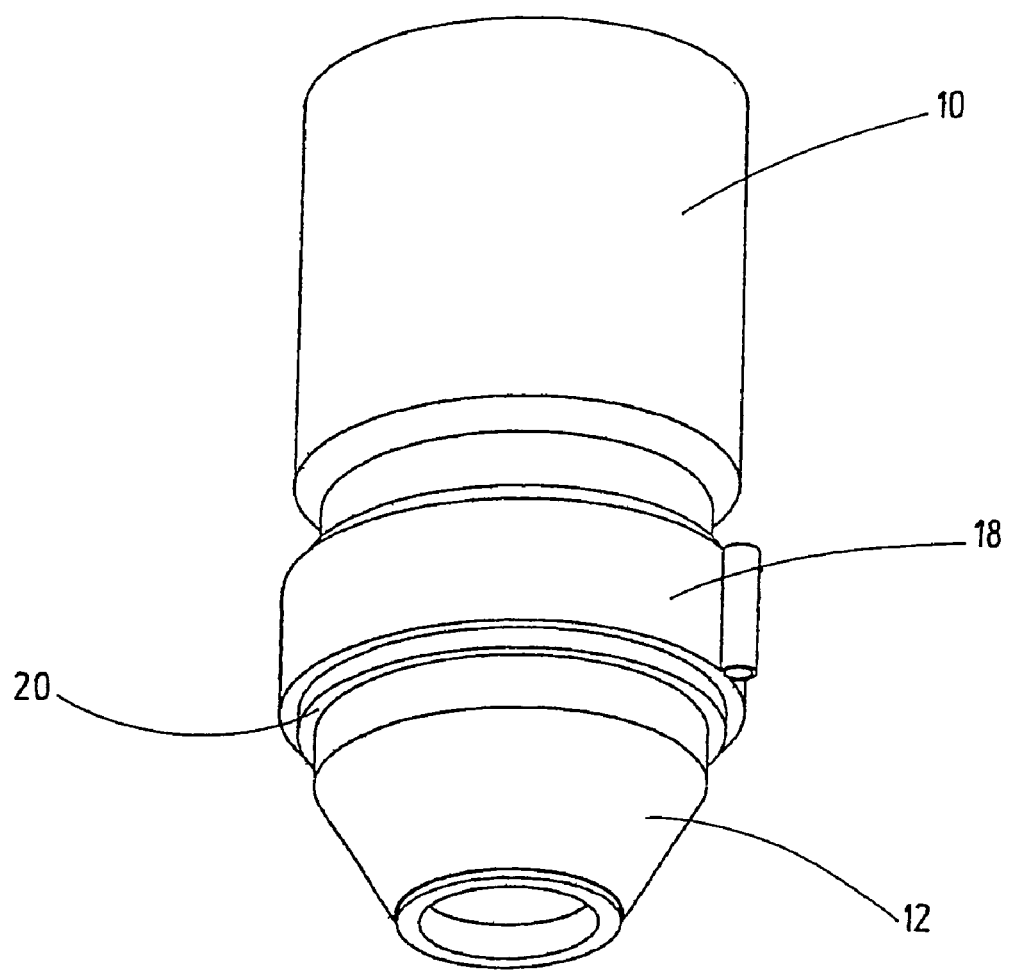

This application is the National Stage of PCT/EP2007/061065 filed on Oct. 17, 2007, which claims priority under 35 U.S.C. §119 of German Application No. 10 2006 059 784.2 filed on Dec. 15, 2006. The international application under PCT article 21(2) was not published in English.

The invention relates to a device for machining, particularly for cutting, electrically conductive workpieces, in accordance with the preamble of claim 1.

Such a machining device, which serves for cutting sheet metal by means of a plasma cutting torch, is known from DE-102004042135 A1. In this device, the distance between the plasma cutting torch and the sheet metal is regulated by means of a data processing unit that controls a drive unit. The capacitance that is formed by means of a nozzle cap that is electrically insulated with regard to the other components of the plasma cutting torch, and the sheet metal, serves as the characteristic variable that characterizes the distance. This capacitance is a function of the distance of the nozzle cap from the sheet metal, and is switched in parallel to an electrical oscillating circuit, whose resonance frequency is analyzed by the data processing unit, as a function of time. The previously known device has already proven itself well in practice. However, the distance measurement is exposed to disruptive influences under certain external conditions, which can influence the precision of the distance regulation.

It is therefore the task of the invention to further develop a device of the type stated initially, in such a manner that external disruptive influences can be better suppressed.

This task is accomplished, according to the invention, by means of a device having the characteristics of claim 1. Advantageous further developments are the object of the dependent claims.

The invention is based on the idea that the second capacitance is switched in series with the first capacitance. In this connection, it was found in experiments that such serial switching makes the assembly less sensitive to external disruptive influences. In contrast to the first capacitance, the second capacitance does not change when the tool is moved, or changes only insignificantly.

According to a first advantageous embodiment, it is provided that the analysis unit has an electrical oscillation circuit switched in parallel to the first and the second capacitance, as well as a data processing unit for analyzing the resonance frequency of the oscillation circuit. According to a second advantageous embodiment, the analysis unit has an electrical voltage source as well as a data processing unit for analyzing a charging and/or discharging time of the two capacitances.

The connection element and the tool head can fundamentally be disposed at a distance from one another and separated by an air gap. However, it is practical if a dielectric is disposed between the tool head and the connection element. Since the substitute capacitance C for serial switching of two capacitances $C_1$ and $C_2$ is calculated according to the formula $$\frac{1}{C} = \frac{1}{C_1} + \frac{1}{C_2},$$

the second capacitance, which is clearly increased by the use of a dielectric, does not have as much weight as the first capacitance, which changes as the distance between tool and workpiece changes.

It is preferred that the dielectric is in contact both with the tool head and with the connection element. It is practical if the dielectric is an insulation layer affixed to the tool head or to the connection element. In this connection, it is preferred that the connection element surrounds the tool head, at least in part. According to preferred embodiments, the connection element can be a clamp that has been clamped onto the tool head, a metal strip that runs around the tool head, or a sleeve that has been pushed over the tool head.

Preferably, the connection element is connected with the analysis unit by means of a connection line, whereby the connection line is rigid, at least in sections. If the connection line cannot move, or can only move slightly, with regard to the machining tool, the second capacitance remains essentially constant even if external forces are acting on the connection line.

Figure 2:
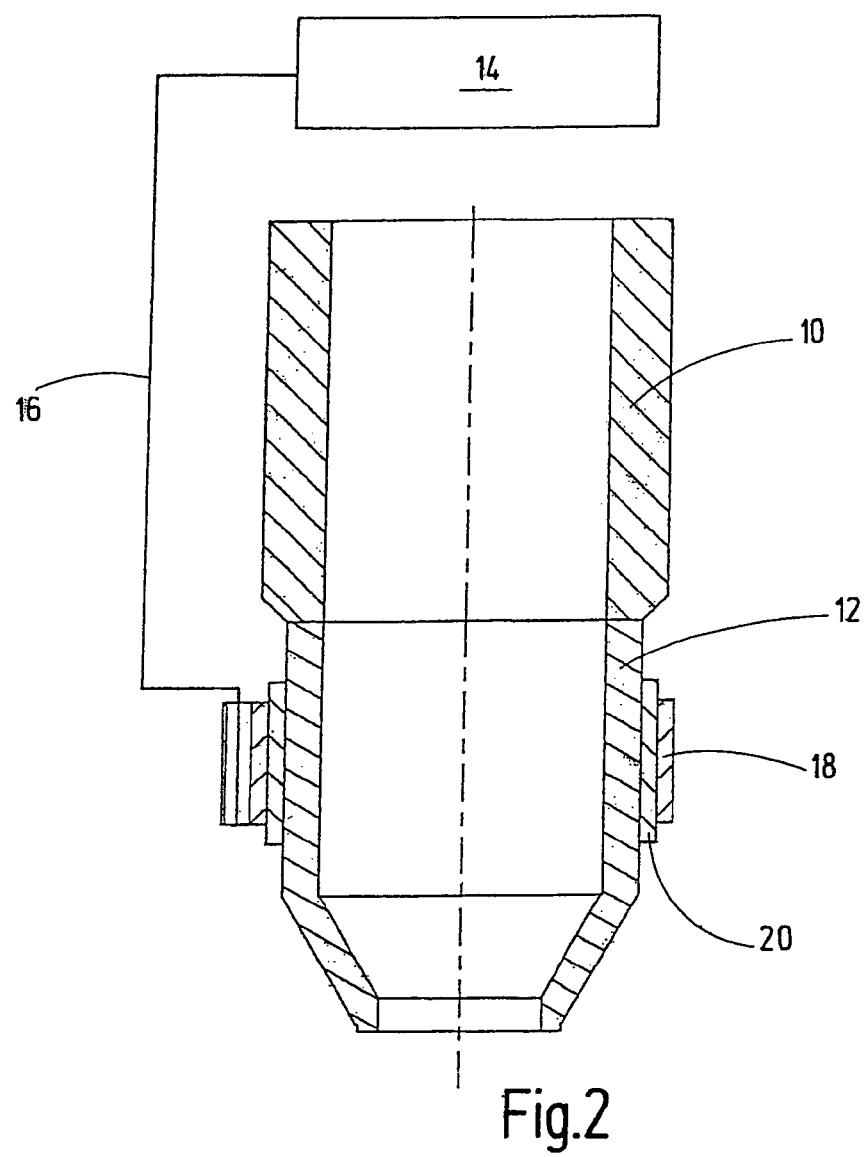
Figure 3:
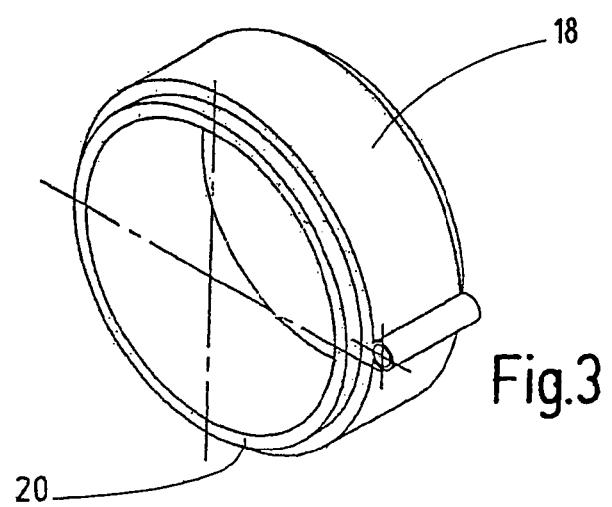

In the following, the invention will be explained in greater detail using an exemplary embodiment shown schematically in the drawing. This shows:

FIG. 1 a schematic representation of an end segment of a plasma cutting torch in a perspective view;

FIG. 2 a longitudinal section through the cutting torch according to FIG. 1, with an analysis unit shown schematically, and FIG. 3 a connection element.

A plasma cutting torch 10, which serves as a machining tool to cut sheet metal, and can be moved by means of a drive unit, not shown in the drawing, has a nozzle cap 12, electrically insulated from its other components, as a tool head, which cap forms a first capacitance with the sheet metal to be cut. The change in the first capacitance, which is dependent on the change in distance between the nozzle cap 12 and the sheet metal, is recorded by an analysis unit 14. This unit has an electrical oscillating circuit, as well as a data processing unit, which analyzes the resonance frequency of the oscillating circuit. The first capacitance is switched in parallel with the oscillating circuit by way of a connection line 16. However, the connection line 16 is not directly connected to the nozzle cap 12. Instead, it is attached to a metal band 18 that runs around the nozzle cap 12. The metal band 18 (FIG. 3) has a layer of a dielectric 20 on its inside, which layer has a uniform thickness circumferentially. The metal band 18 is held at a constant distance from the nozzle cap 12 by means of the dielectric 20 that is glued onto the nozzle cap 12 or held in clamped manner by means of the metal band. The metal band 18 and the nozzle cap 12 thereby form a second capacitance, which is switched in series with the first capacitance. Because of the dielectric 20, the second capacitance is clearly greater than the first capacitance. The connection line 16 is rigid over at least part of its length, so that it cannot move, or can only move slightly, with regard to the machining tool 10.

In summary, the following should be stated: The invention relates to a device for machining, particularly for cutting, electrically conductive workpieces, using a machining tool 10 that can be moved towards and away from a workpiece, by means of a drive device, and that has an electrically insulated, metallic tool head 12, which forms a first capacitance $C_1$ together with the workpiece, and having an analysis unit 14 for analyzing a characteristic variable that depends on the first capacitance $C_1$. According to the invention, it is provided that a metallic connection element 18 is attached to the tool head 12, which element is connected with an analysis unit 14 and forms a second capacitance $C_2$ together with the tool head 12.

The invention claimed is:

1. A device for machining a workpiece comprising:
   a) a machining tool comprising an electrically insulated, metallic tool head forming a first capacitance together with the workpiece;
   b) a drive device for moving the machining tool towards and away from the workpiece;
   c) an analysis unit for analyzing a characteristic variable that depends on the first capacitance; and
   d) a metallic connection element connected with the analysis unit and attached to the tool head forming a second capacitance with the tool head, the second capacitance being connected in series to the first capacitance.

2. The device according to claim 1, wherein the analysis unit has an electrical oscillation circuit switched in parallel to the first and second capacitance, as well as a data processing unit for analyzing the resonance frequency of the oscillation circuit.

3. The device according to claim 1, wherein the analysis unit has an electrical voltage source as well as a data processing unit for analyzing a charging and/or discharging time of the two capacitances.

4. The device according to claim 1, wherein a dielectric is disposed between the tool head and the connection element.

5. The device according to claim 4, wherein the dielectric is in contact with the tool head and the connection element.

6. The device according to claim 4, wherein the dielectric is an insulation layer affixed to the tool head or on the connection element.

7. The device according to claim 1, wherein the connection element surrounds the tool head, at least in part.

8. The device according to claim 7, wherein the connection element is a clamp clamped onto the tool head.

9. The device according to claim 7, wherein the connection element is a metal strip that runs around the tool head.

10. The device according to claim 7, wherein the connection element is a sleeve pushed over the tool head.

11. The device according to claim 1, wherein the connection element is connected with the analysis unit by means of a connection line whereby the connection line is rigid, at least in segments.

* * * * *